United States Patent
Chang et al.

(10) Patent No.: US 6,904,194 B2
(45) Date of Patent: Jun. 7, 2005

(54) OPTICAL SWITCH APPARATUS

(75) Inventors: Chia-Hsiung Chang, Tainan (TW);
Li-Wu Chang, Taoyuan (TW);
Hong-Jueng King, Taoyuan (TW);
Huei-Pin Huang, Taoyuan (TW);
Chwei-Jing Yeh, Sanchung (TW)

(73) Assignee: Alliance Fiber Optics Products, Sunnyvale, CA (US)

(*) Notice: Subject to any disclaimer, the term of this patent is extended or adjusted under 35 U.S.C. 154(b) by 238 days.

(21) Appl. No.: 10/418,165

(22) Filed: Apr. 18, 2003

(65) Prior Publication Data

US 2003/0198430 A1 Oct. 23, 2003

(30) Foreign Application Priority Data

Apr. 19, 2002 (TW) .......................................... 91108151 A

(51) Int. Cl.$^7$ ................................................. G02B 6/35
(52) U.S. Cl. .............................. 385/18; 385/16; 385/20
(58) Field of Search ........................................ 385/14–24

(56) References Cited

U.S. PATENT DOCUMENTS

| 5,535,293 | A | * | 7/1996 | Buchin | ......................... | 385/18 |
| 6,650,805 | B2 | * | 11/2003 | Chen et al. | .................... | 385/18 |
| 6,678,434 | B1 | * | 1/2004 | Goodman et al. | ............. | 385/16 |

* cited by examiner

Primary Examiner—Akm Enayet Ullah
Assistant Examiner—Kevin S. Wood
(74) Attorney, Agent, or Firm—Bacon & Thomas PLLC

(57) ABSTRACT

An optical switch apparatus is disclosed, which applies to the optical communication system or optical system for switching the optical path. The optical switch apparatus utilizes a servomotor rotates a circle mirror unit which two surfaces are coated or deposited a reflecting film and has a plurality of holes. Thereby the optical signals are transmitted from the fibers pass through the holes for transmitting to the others fibers, or the optical signals reflex to the others fibers via the reflecting film for switching the optical path.

6 Claims, 7 Drawing Sheets

OPTICAL SWITCH APPARATUS

BACKGROUND OF THE INVENTION

1. Field of the Invention

The present invention relates to an optical switch apparatus and, more particularly, to an optical switch apparatus with a high reflective mirror having a plurality of holes and a servo control.

2. Description of Related Art

Conventionally, the optical switch apparatus uses for switching the optical paths, or uses for adding/dropping optical signal. The prior optical switch apparatus controls a prism via relays or mechanism means in order to switch the transmitting optical signal to another optical path. However, the switching speed of the relays is slow so that the development of the high-speed transmission optical communication system has a limit.

In addition, the general optical switch apparatus only has 2×2 routing paths. Therefore, it has to add external two optical switch apparatus to approach capable of multi-routing paths (e.g., 4×4 routing paths) so that the space of the system becomes large and the cost will add.

Therefore, it is desirable to provide an improved speech recognition method to mitigate and/or obviate the aforementioned problems.

SUMMARY OF THE INVENTION

The object of the present invention is to provide an optical switch apparatus that uses servo to control a reflecting mirror-disk for quickly switching routing path and capable of multi-plexing.

To achieve the object, the optical switch apparatus coupled to a plurality of pigtail units or a plurality of fibers comprising: a mirror unit having at least one hole, wherein the surface of the mirror unit is coated or deposited a layer of reflecting materials, thereby an optical signal output from one of said pigtail units or from one of said fibers passes through said hole for transmitting to other pigtail units or other fibers, or said optical signal is reflected to the other pigtail units or the others fibers via the reflection of the layer of reflecting materials; and a driver unit, for rotating the mirror unit or changing the position of the mirror unit relative to the pigtail units, or to the fibers so that said optical signal can transmit to at least one or more than one optical paths.

Other objects, advantages, and novel features of the invention will become more apparent from the following detailed description when taken in conjunction with the accompanying drawings.

DETAILED DESCRIPTION OF THE PREFERRED EMBODIMENT

The driver unit of the optical switch apparatus of the present invention can be any conventional driver. Preferably, the driver unit includes at least one shaft mounted on or passing through a mirror unit. The mirror unit of the optical switch apparatus of the present invention is a mirror, which is coated with a layer of reflecting material on at least one surface Preferably, both the surfaces of said mirror unit are coated with reflecting materials. The shape of the mirror unit is unlimited. Preferably, the mirror unit is a disk mirror. The driver unit of the optical switch apparatus of the present invention can be any conventional driver. Preferably, the driver unit is a servomotor or a stepper motor. The number of the holes of the mirror unit of the present invention is unlimited. Preferably, the mirror unit has four holes.

The following embodiment of the present invention is an example of an operation of an optical add/drop multiplexer (OADM) by using the optical switch of the present invention.

Figure 1:
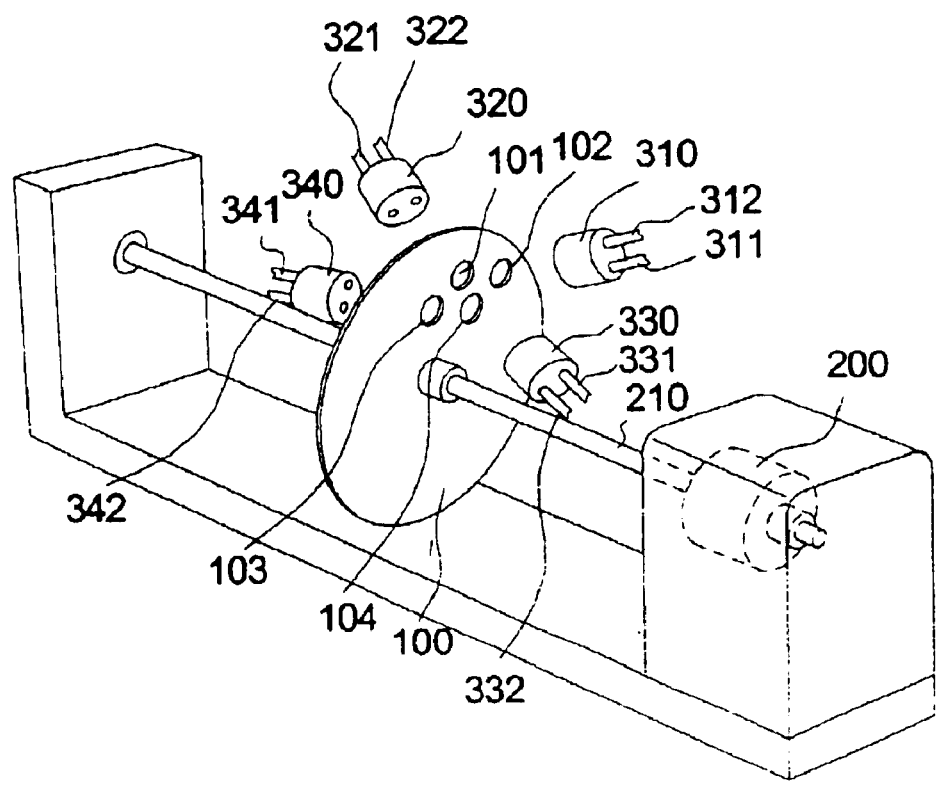
FIG. 1 is a structure schematic view according to the invention.

With reference to FIG. 1, there is shown a schematic view of the structure of the optical switch according to the invention. The optical switch of the represent embodiment comprises a mirror unit 100 and a driver unit 200. Wherein mirror unit 100 is in a shape of a disk. As shown in FIG. 1, the mirror unit 100 has four holes 101, 102, 103 and 104. Moreover, each of the two surfaces of the mirror unit 100 is coated or deposited a layer of high reflecting film 110. In the embodiment, the driver unit 200 is preferred to be a stepper motor. However, a stepper motor can also be replaced by a servomotor. The shaft 210 of the driver unit 200 is mounted on the disks and it also passes through the mirror unit 200 for synchronously rotating the mirror unit 200. The optical switch apparatus of the present invention can couple four pigtail units 310, 320, 330 and 340. Each pigtail of the four pigtail units 310, 320, 330 and 340 further includes two transmitting fibers 311, 312, 321, 322, 331, 332, 341 and 342.

Figure 2:
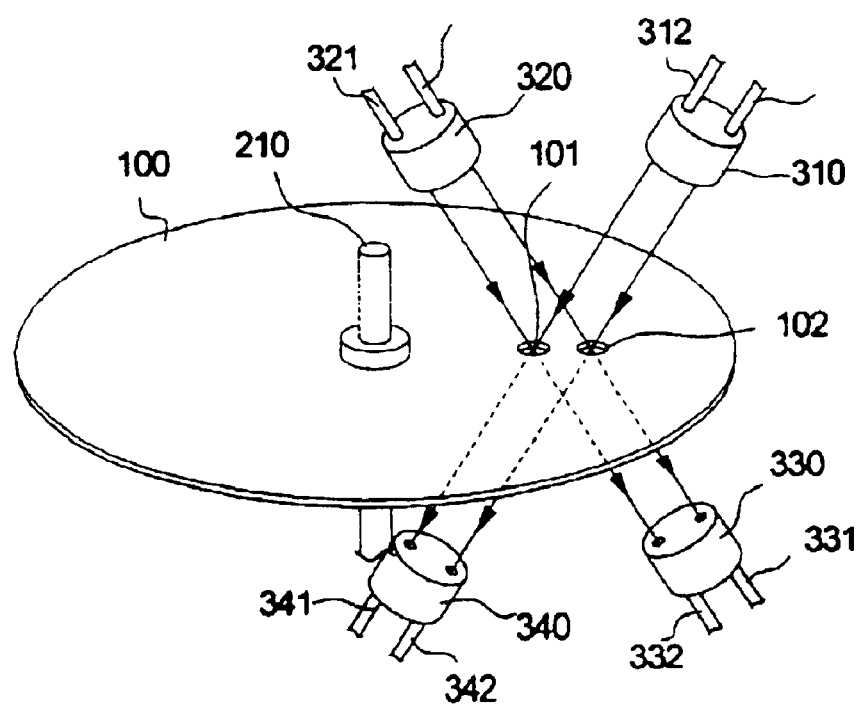
FIG. 2 is a schematic view of a first preferred embodiment according to the invention.

FIG. 2 shows a schematic view of switching optical path according to the first preferred embodiment of the present invention. When the optical signal from the fibers 311 and 312 of the pigtail unit 310 is needed to be transmitted to the fibers 341 and 342 of the pigtail unit 340, and another optical signal from the fibers 321 and 322 of the pigtail unit 320 is required to be transmitted to the fibers 331 and 332 of the pigtail unit 330, the driver unit 200 will drive to rotate the mirror unit 100 via the shaft 210 (as shown in FIG. 1) in an angle so that the holes 101 and 102 on the mirror unit 100 are aligned to the optical path of these optical signals.

Thereby, the optical signal from the fiber 311 passes through the hole 102 on the mirror unit 100 and further reaches the fiber 342. At the same time, the optical signal from the fiber 312 also passes through the hole 101 and enters the fiber 341. Similarly, the optical signal from the fiber 321 is transmitted to the fiber 332 via the hole 101, and the optical signal from the fiber 322 reaches the fiber 331 via the hole 102. Sure, since the transmission way of the optical signal is not limited as a one-way direction, it may be bi-direction. For example, the optical signal from fiber 342 can pass through the hole 102 and further reach the fiber 311.

Figure 3:
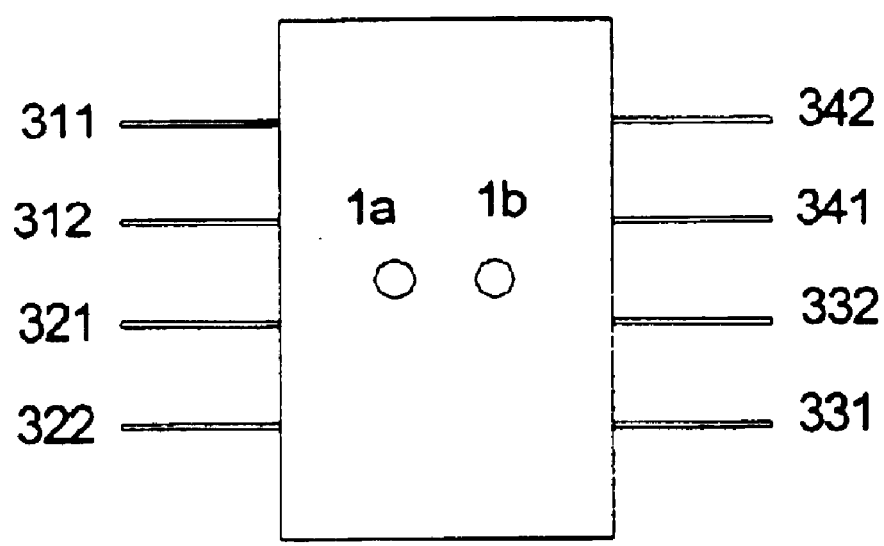
FIG. 3 is an optical path of an optical signal schematic view of the first preferred embodiment according to the invention.

FIG. 3 shows the routing path of the each optical signal is switched to 4×4 paths schematic view of the first preferred embodiment.

Figure 4:
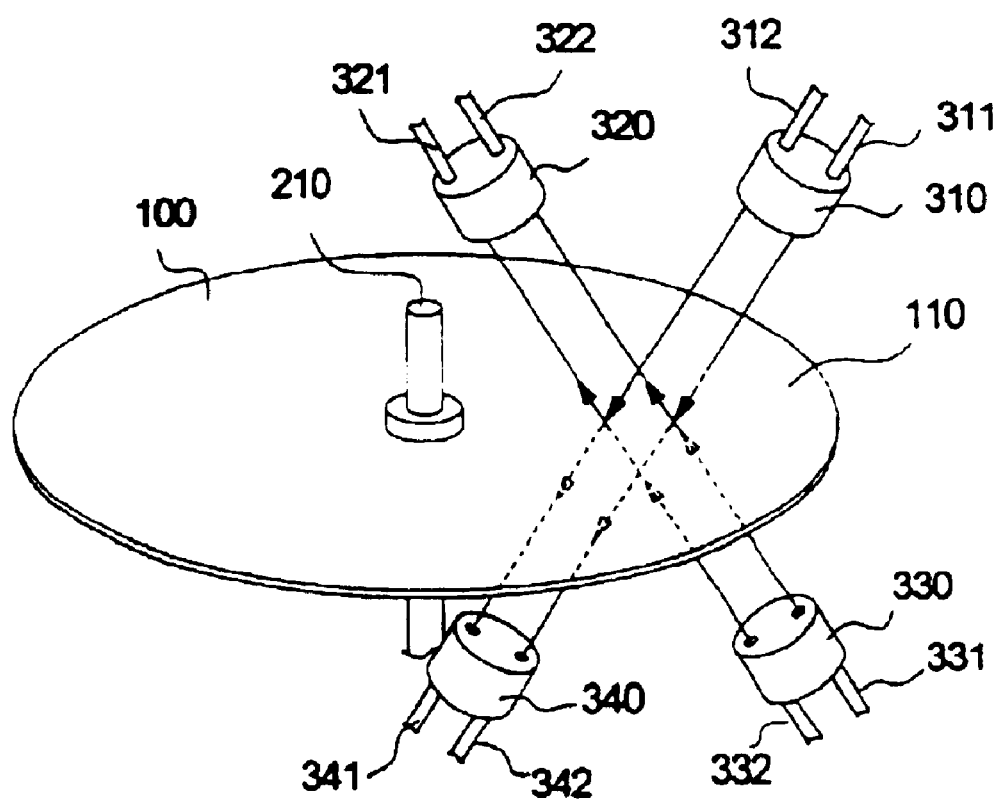
FIG. 4 is a schematic view of a second preferred embodiment according to the invention.

FIG. 4 shows the schematic view of the second embodiment. When the driver unit 200 rotates the mirror 100 via the shaft 210 to a position so that the holes 101, 102, 103 and 104 are not locating on the optical path of the optical signals. Thereby, the optical signal from the fiber 311 reflects to the fiber 322 via the reflecting material film 110 on the upper surface of the mirror unit 100. The optical signal from the fiber 312 also reflects to the fiber 321 via the reflecting material film 110 on the upper surface of the mirror unit 100. Similarly, the optical signal from the fiber 331 reflects to the fiber 342 via the reflecting material film 110 on the bottom surface of the mirror unit 100. The optical signal from the fiber 332 reflects to the fiber 341 via the reflecting material film 110 on the below surface of the mirror unit 100. As expected, the transmission way of the optical signal may also be bi-direction.

Figure 5:
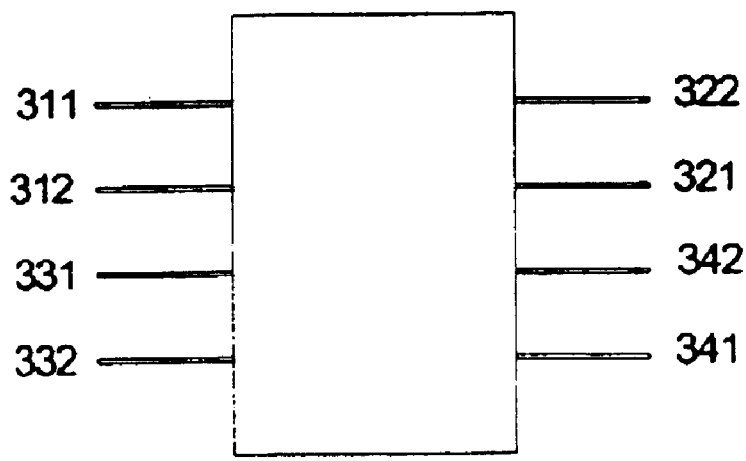
FIG. 5 is an optical path of an optical signal schematic view of the second preferred embodiment according to the invention.

FIG. 5 shows the routing path of the each optical signal is switched to 4×4 paths via the reflecting film 110 schematic view of the second preferred embodiment.

Figure 6:
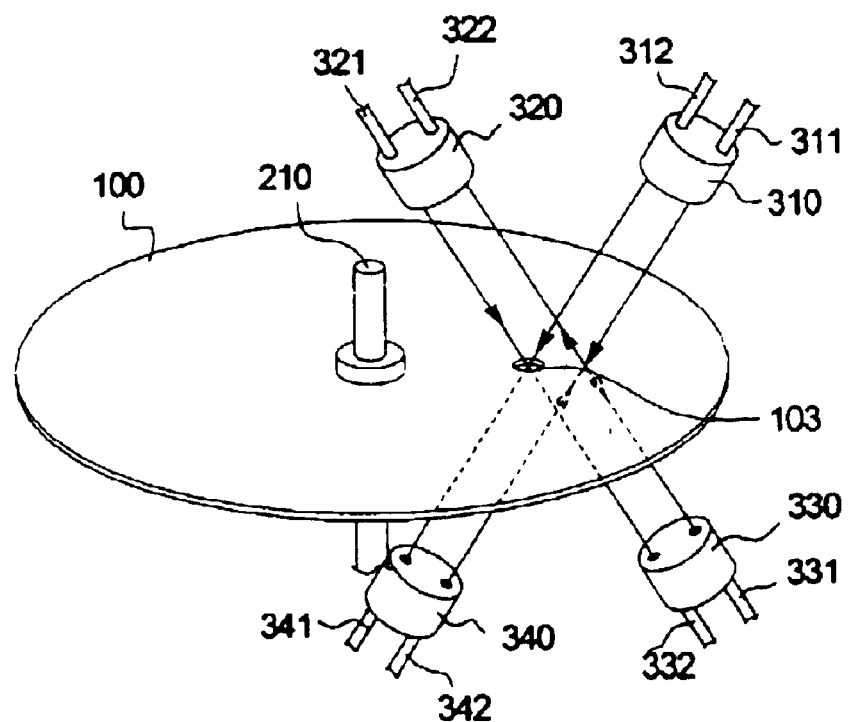
FIG. 6 is a schematic view of a third preferred embodiment according to the invention.

FIG. 6 shows a schematic view of a third preferred embodiment according to the present invention. When the driver unit 200 rotates the mirror 100 via the shaft 210 to a position so that the hole 103 or any other hole does not locate the optical path of the optical signals. Thereby, the optical signal form the fiber 311 reflects to the fiber 322 via the reflecting material film 110 on the upper surface of the mirror unit 100. The optical signal from the fiber 312 passes through the hole 103 to reach the fiber 341. The optical signal from the fiber 321 passes through the hole 103 to reach the fiber 332. The optical signal from the fiber 331 reflects to the fiber 342 via the reflecting material film 110 on the below surface of the mirror unit 100. Of course, the transmission way of the optical signal may be either single-direction or bi-direction.

Figure 7:
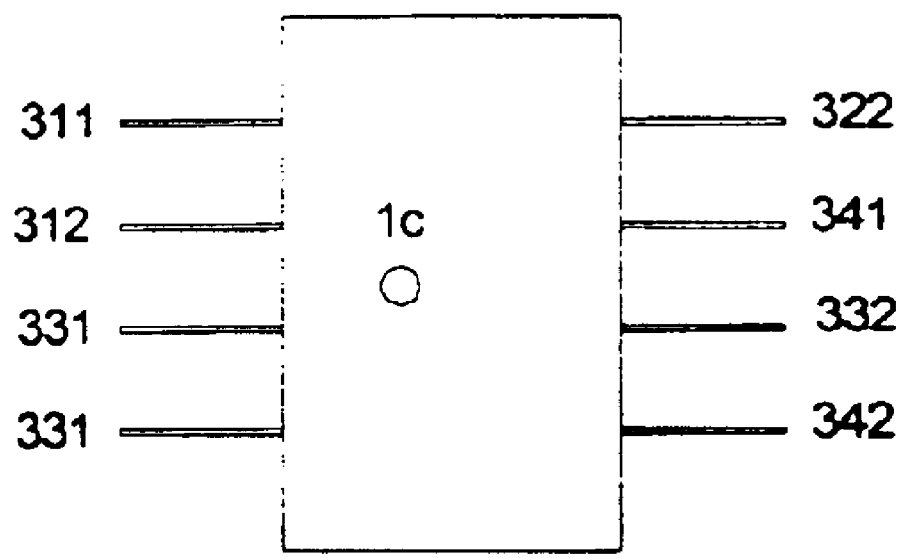
FIG. 7 is an optical path of an optical signal schematic view of the third preferred embodiment according to the invention.

FIG. 7 shows the optical signal capable of multi-path via passing through the holes or reflected by the reflecting material film 110 schematic view of the third preferred embodiment.

In view of the foregoing, it is known that the optical switch of the present invention utilizes a servo motor capable of rotating a circular mirror unit having a plurality of holes within a very short time, thereby the optical signal from the fibers can be switched to different fibers via the circular mirror unit for fast switching the optical signal to different optical path, and capable of multi-path (or multi-plexing) switching.

Although the present invention has been explained in relation to its preferred embodiment, it is to be understood that many other possible modifications and variations can be made without departing from the spirit and scope of the invention as hereinafter claimed.

What is claimed is:

1. An optical switch apparatus coupled to a plurality of pigtail units or a plurality of fibers comprising:

a mirror unit having at least one hole, wherein the surface of the mirror unit is coated or deposited a layer of reflecting materials, thereby an optical signal output from one of said pigtail units or from one of said fibers passes through said hole for transmitting to other pigtail units or other fibers, or said optical signal is reflected to the other pigtail units or the others fibers via the reflection of the layer of reflecting materials; and a driver unit, for rotating the mirror unit or changing the position of the mirror unit relative to the pigtail units, or to the fibers so that said optical signal can transmit to at least one or more than one optical paths.

2. The optical switch apparatus as claimed in claim 1, wherein the driver unit has at least a shaft mounted on or passing through said mirror unit for rotating said mirror unit.

3. The optical switch apparatus as claimed in claim 1, wherein both surfaces of said mirror are coated with said reflecting materials for reflecting said optical signal.

4. The optical switch apparatus as claimed in claim 1, wherein said mirror unit is a disk.

5. The optical switch apparatus as claimed in claim 1, wherein said driver unit is a servomotor or a stepper motor.

6. The optical switch apparatus as claimed in claim 1, wherein said mirror unit has four holes.

* * * * *